July 21, 1953  B. V. COPLAN ET AL  2,646,346
MULTISTAGE MIXER-SETTLER APPARATUS
Filed Feb. 27, 1950  3 Sheets-Sheet 1
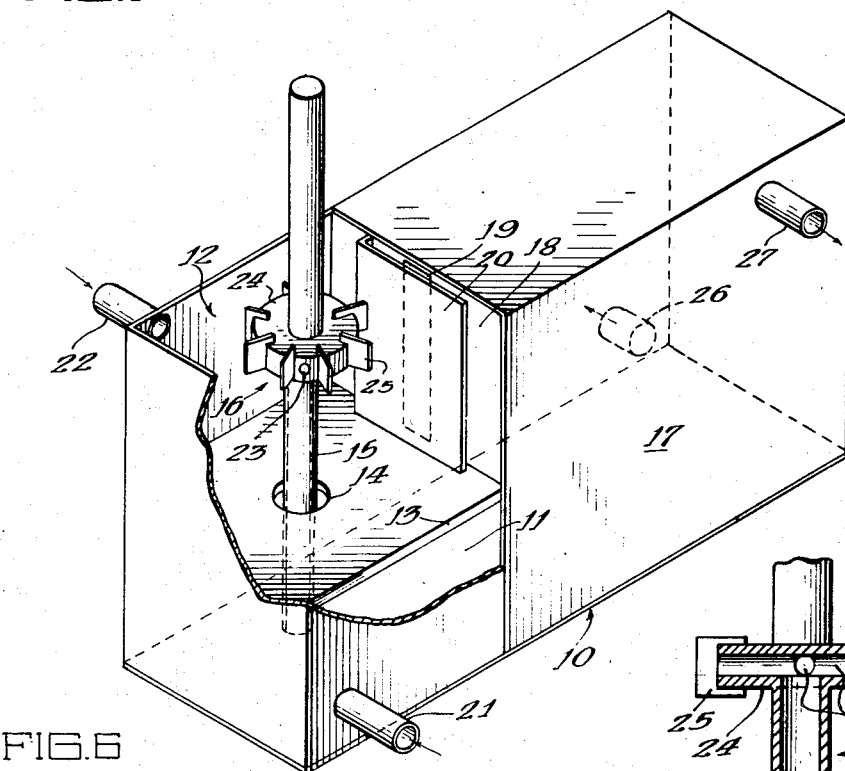
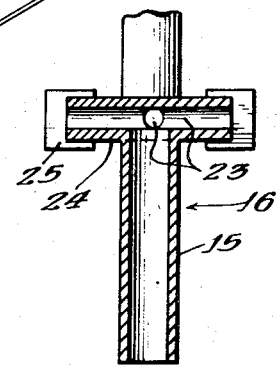
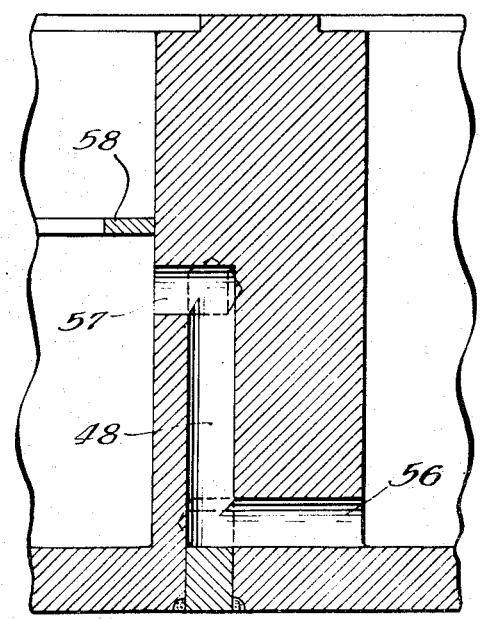
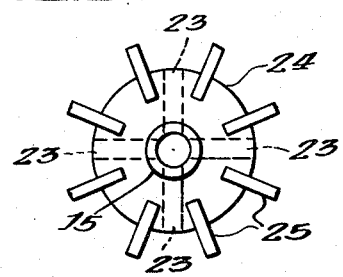
INVENTOR.
Edwin L. Zebrowski
Burton V. Coplan
BY
Roland G. Anderson
Attorney

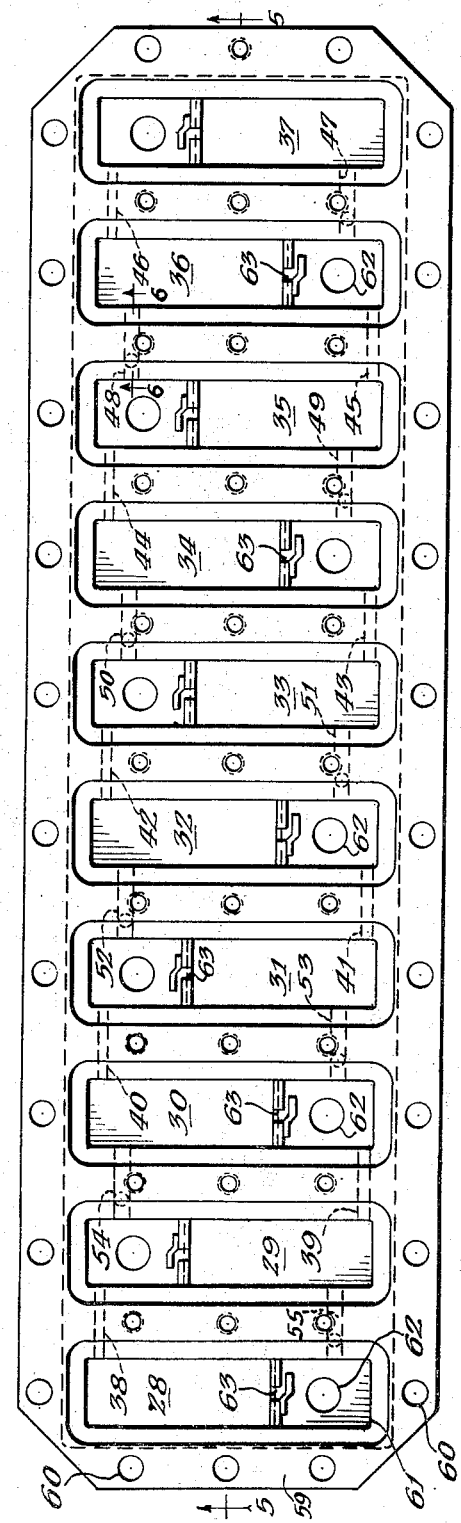

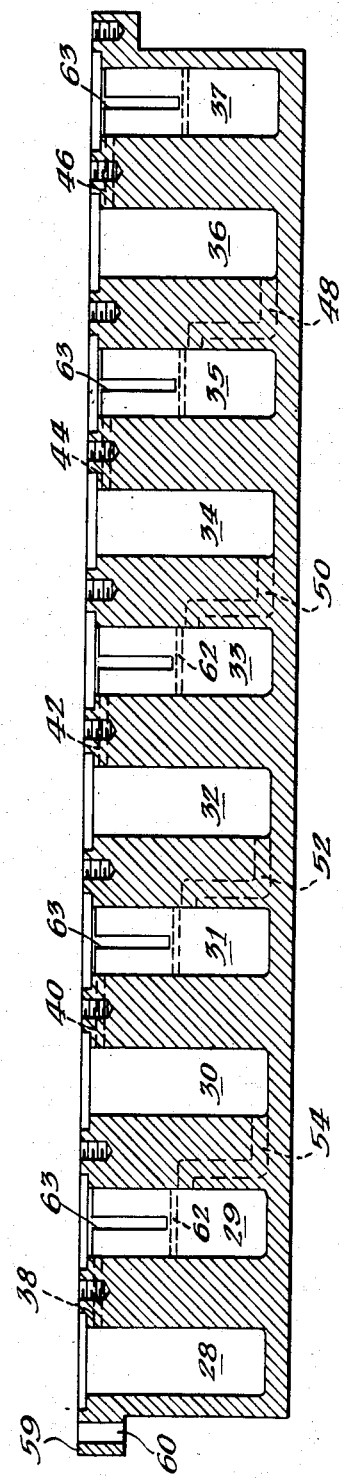

Patented July 21, 1953

2,646,346

UNITED STATES PATENT OFFICE 2,646,346

MULTISTAGE MIXER-SETTLER APPARATUS

Burton V. Coplan, Troy, and Edwin L. Zebroski, Albany, N. Y., assignors to the United States of America as represented by the United States Atomic Energy Commission Application February 27, 1950, Serial No. 146,422

3 Claims. (Cl. 23—270.5)

The present invention relates to mixer-settler units and in particular it pertains to multi-stage mixer settler units wherein flow of liquids under treatment is co-current in each stage while flow through the entire unit is countercurrent.

For certain uses it is highly desirable to provide a mixer-settler of simple, compact construction which is capable of high efficiency and adaptable to remote control. Heretofore mixer-settlers employing stage co-current, overall countercurrent flow were unsatisfactory because of lack of control of the interface between the heavy and light liquid phases in the unit. It has been suggested that the interface may be controlled near the center of a given stage of a horizontal type mixer-settler by tilting the entire unit. However the degree of tilt is affected by the flow rates of the phases, and when stirrers are used in the mixing zone, the design and speed of the stirrer must be considered. Additionally, the degree of tilt will vary with the relative densities of the phases. In view of these disadvantages and since a horizontal unit is more convenient to install and operate by remote control, a device was sought which would make possible a mixer-settler made up of a series of horizontally disposed stages having positive control of the interface in each stage and giving a reproduceable flow pattern through the unit. After a preliminary investigation a mixer-settler unit was constructed consisting of a plurality of horizontally disposed stages each equipped with a stirrer or impeller in each stage. The impeller disc was mounted around a hollow shaft which extended into the two liquid phases and acted as a pump. It was found that this application of a pump-impeller could satisfactorily control the phase interface at any desired point. Such a unit was tested with a two phase aqueous-organic solvent system to measure mixing efficiency. The tests showed that in order to obtain a high stage mixing efficiency of 96% it was necessary to rotate the impeller at 1590 R. P. M. It was found that under conditions which gave good control of the interface location, the mixing efficiency was poor, while the interface control became poor when the impeller R. P. M. was made high enough to give good mixing efficiency, especially if the shaft was not true and there was some whipping of the shaft to contribute turbulence to the solutions. The concept of using a pump-mix impeller was, therefore, temporarily set aside and various other extractor designs not involving the pump-mix impeller were tested over a period of several months. Various difficulties with these units led to a further consideration of the pump-impeller type of unit in an effort to produce a machine wherein the liquid interface is free of turbulence even when the impeller R. P. M. is high enough to give good contacting efficiency in the mixing stage of the unit.

It is an object of this invention to provide a horizontal, multi-stage mixer-settler unit having high mixing efficiency and close control of the interface in each stage despite density gradients due to mass transfer of solute between the two phases and despite pressure drops due to the flow of liquid through the apparatus.

It is a further object of this invention to provide a mixer-settler unit having a definite and maintainable flow pattern wherein the heavier phase is obliged to traverse a zone of high turbulence in passing from stage to stage, thereby eliminating channeling or bypassing.

It is a further object of this invention to provide a mixer-settler that can be operated horizontally so that provision for calculating and maintaining tilt of the apparatus can be eliminated.

The foregoing objects are achieved in the present apparatus by the use of a centrifugal pump type impeller to give fluid flow, interface control and mixing action. This impeller is used in combination with a novel arrangement of horizontal and vertical plates which permits achievement of high mixing efficiency while maintaining good interface control.

This invention may be more fully understood by reference to the appended drawings wherein:

Fig. 1 represents a typical mixer-settler stage, portions thereof being broken away.

Fig. 2 is an elevational view partly in section of a pump-mix stirrer or impeller of the type shown in Fig. 1.

Fig. 3 is a plan view of the impeller shown in Fig. 2.

Fig. 4 is a top view of a ten stage mixer-settler unit with the top cover removed.

Fig. 5 is a cross section along line V—V of Fig. 4, and

Fig. 6 is a cross section along line VI—VI of Fig. 4.

With reference to Fig. 1, the single stage 10 therein represented consists of an inlet section 11 for a heavy phase such as an aqueous phase. This is vertically separated from a mixing section 12 by a horizontal plate 13 provided at the center thereof with a circular opening 14 to accommodate the shaft 15 of pump-impeller 16.

The mixing section 12 and the inlet section 11 are separated from the settling section 17 by a partition 18 having therein a vertical slot 19 communicating with the mixing section and shielded by a baffle 20.

An inlet 21 for the heavier phase, such as an aqueous solution, is positioned to admit liquid to the aqueous inlet section, which is located below the mixing section.

The lighter phase, for example, hexone, is admitted at the top of the mixing section through an inlet 22.

The pump-mix stirrer 16 is shown in Figs. 2 and 3 and consists of a hollow shaft 15 connecting with four passages 23 drilled radially in a horizontal disc 24. Eight vertical turbine blades 25 secured to disc 24 provide mixing action. The lower end of the shaft 15 extends through the opening 14 in plate 13 and into the aqueous inlet section. Rotation of the stirrer is achieved by any suitable means, such as an electric motor (not illustrated).

In operation, rotation of the impeller 16 pumps liquid from the aqueous inlet section and the settling section of the next higher stage into the mixing section, where it is contacted with the lighter phase, such as hexone which enters the mixer section 12 from the settling section of the next lower stage. The mixed phases are discharged through slot 19 into the settling section 17. The interface in this section is accurately controlled in a predetermined position by the location of the end of the hollow shaft of the impeller in the next lower stage.

Section 17 is provided with two outlets. The one for the heavier phase, 26, being located at the bottom of the section 17 and communicating with the aqueous inlet section of the next lower stage; whereas the outlet 27 for the lighter phase is located at the top of section 17 and communicates with the mixing section of the next higher stage. These outlets are placed at a position remote from the slot to permit maximum settling.

The mixer is rotated rapidly enough to have a pumping capacity greater than the aqueous feed rate. The aqueous level in the inlet section makes and breaks contact at the tip of the hollow shaft 15. Preferably the opening 14 in plate 13 provides a fit sufficiently loose to permit the hexone to cycle to the lower section and be pumped up as the aqueous phase level breaks contact with the tip of the shaft.

A multi-stage unit embodying the present invention is shown in Figs. 4 to 6 inclusive. With particular reference to Figs. 4 and 5, the unit comprises ten stages 28 to 37 inclusive, each stage including an aqueous inlet section, a mixing section, a pump-mix stirrer, and a settling section in all respects similar to the stage described in detail in connection with Figs. 1 to 3. The several stages are interconnected adjacent the top thereof by passages 38 to 46 which permit flow of the lighter phase from the top of a settling section to the mixing section of the next higher stage. A second series of passages 47 to 55 connects the lower portion of the settling section of a stage with the aqueous inlet section of the next lower stage. Fig. 6 shows a section through a typical passage, 48, of this series. The passage inlet 56 is located adjacent the bottom of the settling section of stage 36. The passage outlet 57 is placed higher but is below the horizontal plate 58 which separates the aqueous inlet section from the mixing section of stage 35. As illustrated in Fig. 4, a circular opening 62 in the bottom of the mixing section 61 of stage 28 provides communication between this section and the lower inlet section of this stage. The remainder of the cells are similarly constructed.

The entire unit is provided with a circumferential flange 59 and bolt holes 60 for attaching a suitable cover (not illustrated).

In the operation of a unit like that shown in Figs. 4 and 5, a light phase, such as hexone a solvent, may be introduced into the mixing section 61 of stage 28 from an outside source through a suitable nozzle (not illustrated). A heavier phase, such as a solution of ammonium nitrate, $NH_4NO_3$, is pumped through passage 55 from the settling section of stage 29 and into the mixing stage 61 by a pump-mix impeller of the type illustrated in Figs. 1 to 3 inclusive. The two phases are thoroughly mixed in section 61, and are discharged through slot 63 to the settling section of stage 28. The heavier phase flows from adjacent the bottom of this section through an outlet (not illustrated) while the lighter phase proceeds through passage 38 to the mixing section of stage 29. It will then be seen that flow in any given stage is co-current, whereas flow through the entire unit is counter-current. In the final stage 37, hexone is removed from adjacent the top of the settling section through a suitable outlet (not illustrated) while ammonium nitrate is introduced into the aqueous inlet section of this stage through a similar inlet (not illustrated).

The efficiency of the present type of mixer settler is shown in the following table of two runs made with a single stage pump-mix unit to determine efficiency as a function of stirrer R. P. M.

The efficiency was measured by transfer of nitric acid from 8M ammonium nitrate to pretreated hexone. Two sets of flow rates were used:

*Flow rate 160 cc./min. hexone, 80 cc./min. aqueous*

| Stirrer R. P. M.: | Percent efficiency |
|---|---|
| 370 | 70 |
| 460 | 81 |
| 545 | 91.5 |
| 630 | 96.5 |
| 770 | 97.5 |
| 800 | 98.5 |
| 910 | 96.5 |
| 1030 | 96.5 |

*Flow rate 80 cc./min. hexone, 40 cc./min. aqueous*

| Stirrer R. P. M.: | Percent efficiency |
|---|---|
| 470 | 79.5 |
| 530 | 86.5 |
| 650 | 94 |
| 780 | 96.5 |
| 910 | 98 |
| 1010 | 96.5 |

The present unit by using a horizontal plate separating the mixing section from the aqueous inlet section of each stage confines the mixing action to a relatively small volume, improves the mixing efficiency, virtually eliminates back mixing of the aqueous phase, and provides a quiet section for interface control. High mixing efficiency is achieved at stirrer speeds in the neighborhood of 750 R. P. M., whereas in apparatus without blades on the impeller and without the horizontal plate comparable mixing efficiency was obtainable only with impeller speeds approximately twice as great. While the unit may be capable of satisfactory operation without a horizontal plate, especially if the cell depth is increased, the presence of such a plate results in a definite improvement in the apparatus.

The position of the interface in the settling section of the stage preceding any given stage N relative to the tip of the stirrer shaft in stage N is a function of the pressure drops of the aqueous and hexone phases in flowing from one stage to the next, as well as the density differential between the aqueous and hexone phases. The smaller the density differential between the two phases and the greater the pressure drop due to flow, the higher the interface above the bottom of the stage.

In those banks where the aqueous phase is being stripped and thus decreasing in density, the effect of change in density from stage to stage is to lower the interface in the settling section. In those banks where the hexone phase is being stripped, the effect of change in density is to raise the interface in the settling section.

It will be seen that by means of the present invention a multi-stage mixer-settler unit has been provided which gives maximum efficiency and maximum interface control in the several stages without resort to tilting the unit. Since numerous variations of this inventive concept may occur to those skilled in the art, the scope of the invention is not restricted to the specific embodiment illustrated herein, but is limited only as defined by the appended claims.

In the claims:

1. A mixer-settler unit for contacting a light and a heavy liquid phase comprising a plurality of horizontally arranged stages, each stage comprising an inlet section for the heavy phase, an inlet for said section, a mixing section above the inlet section, inlet means in the mixing section for admitting the light phase, a horizontal plate separating said inlet section and said mixing section, combined stirring and pumping means in said mixing section comprising a shaft at least the lower portion thereof being hollow, a disc fixed perpendicularly to the axis of the shaft, a plurality of vertically arranged turbine blades secured to the periphery of the disc, means defining radial passages in said disc and communicating with the hollow lower portion of said shaft, said portion of said shaft extending through said plate and into said inlet section whereby the liquid level in the inlet section is maintainable at a predetermined level, a settling section communicating with said mixing section, and outlets in said settling section adjacent the top and bottom thereof for removal of the light and heavy phases respectively.

2. A mixer-settler unit for contacting a light and a heavy liquid phase comprising a plurality of horizontally arranged stages, each stage comprising an inlet section for the heavy phase, an inlet for said section, a mixing section above the inlet section, inlet means in the mixing section for admitting the light phase, a horizontal plate separating said inlet section and said mixing section, combined stirring and pumping means in said mixing section comprising a shaft at least the lower portion thereof being hollow, a disc fixed perpendicularly to the axis of the shaft, a plurality of vertically arranged turbine blades secured to the periphery of the disc, means defining radial passages in said disc and communicating with the hollow lower portion of said shaft, said portion of said shaft extending through said plate and into said inlet section whereby the liquid level in the inlet section is maintainable at a predetermined level, a settling section adjacent the mixing and inlet sections, means defining a vertical slot providing communication between the mixing section and the settling section, a baffle in the mixing section extending across the said slot means, and outlets in said settling section adjacent the top and bottom thereof for removal of the light and heavy phases respectively.

3. A mixer-settler unit for contacting a light and a heavy liquid phase comprising a plurality of horizontally arranged stages, each stage comprising an inlet section for the heavy phase, an inlet for said section, a mixing section above the inlet section, inlet means in the mixing section for admitting the light phase, a horizontal plate separating said inlet section and said mixing section combined stirring and pumping means in said mixing section comprising a shaft at least the lower portion thereof being hollow, a disc fixed perpendicularly to the axis of the shaft, a plurality of vertically arranged turbine blades secured to the periphery of the disc, means defining radial passages in said disc and communicating with the hollow lower portion of said shaft, said portion of said shaft extending through said plate and into said inlet section whereby the liquid level in the inlet section is maintainable at a predetermined level, a settling section adjacent the mixing and inlet sections, means defining a vertical slot providing communication between the mixing section and the settling section, a baffle in the mixing section extending across the said slot means, and outlets in said settling section remote from said slot means and positioned adjacent the top and bottom of said section for removal of the light and heavy phases respectively.

BURTON V. COPLAN.
EDWIN L. ZEBROSKI.

References Cited in the file of this patent

UNITED STATES PATENTS

| Number | Name | Date |
| --- | --- | --- |
| 2,176,899 | Gordon et al. | Oct. 24, 1939 |
| 2,405,158 | Mensing | Aug. 6, 1946 |